United States Patent
Viton et al.

(10) Patent No.: US 10,484,829 B1
(45) Date of Patent: Nov. 19, 2019

(54) METHODS AND SYSTEMS FOR GENERATING MAPS CORRESPONDING TO PHYSICAL SPACES, DEVICES, AND/OR USERS

(71) Applicant: MICROSOFT TECHNOLOGY LICENSING, LLC, Redmond, WA (US)

(72) Inventors: Fernando Nahuel Viton, Kirkland, WA (US); Matthew Evan Vogel, Seattle, WA (US); Gregory Christopher John Vandenbrouck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/964,751

(22) Filed: Apr. 27, 2018

(51) Int. Cl.
| | |
|---|---|
| H04W 4/00 | (2018.01) |
| G06F 17/00 | (2019.01) |
| H04W 4/029 | (2018.01) |
| H04W 4/38 | (2018.01) |
| H04W 4/021 | (2018.01) |
| G01C 21/20 | (2006.01) |

(52) U.S. Cl.
CPC .......... *H04W 4/029* (2018.02); *G01C 21/206* (2013.01); *H04W 4/021* (2013.01); *H04W 4/38* (2018.02)

(58) Field of Classification Search
CPC .............. H04L 41/12; H04L 41/0893; H04W 36/0055; H04W 4/29; G06F 17/30436; G06F 17/30
USPC .................. 707/602, 760; 455/411, 456.1
See application file for complete search history.

(56) References Cited

U.S. PATENT DOCUMENTS

| | | | |
|---|---|---|---|
| 6,067,093 A * | 5/2000 | Grau | G06T 11/206 |
| | | | 345/440 |
| 9,361,139 B1 * | 6/2016 | Baig | G06F 9/455 |
| 9,551,594 B1 | 1/2017 | Stamatakis | |
| 9,853,827 B1 | 12/2017 | Goodnow et al. | |

(Continued)

FOREIGN PATENT DOCUMENTS

| | | |
|---|---|---|
| WO | 2015160346 A1 | 10/2015 |
| WO | 2016054629 A1 | 4/2016 |

OTHER PUBLICATIONS

"Non Final Office Action Issued in U.S. Appl. No. 15/981,695", dated May 30, 2019, 19 Pages.

(Continued)

*Primary Examiner* — William D Cumming
(74) *Attorney, Agent, or Firm* — Workman Nydegger

(57) ABSTRACT

Generating a map based on nodes of a hierarchical graph that defines a topology of a physical space and is configured to provide access to sensor data from devices within the physical space includes accessing the hierarchical graph. The hierarchical graph comprises a plurality of nodes, including a top node for the physical space and a plurality of other nodes coupled to the top node. One of the plurality of nodes comprises an area node that represents an area within the physical space. One of the plurality of nodes also comprises a device node representing a device located within the physical space and a user node. Map data corresponding to a particular node is generated. The generated map data is associated with generating at least a portion of a map corresponding to the particular node. The generated map data corresponding to the particular node is stored within the hierarchical graph.

20 Claims, 8 Drawing Sheets

(56) References Cited

U.S. PATENT DOCUMENTS

| | | | |
|---|---|---|---|
| 9,882,782 B2* | 1/2018 | Finkler | H04L 41/12 |
| 10,027,551 B1* | 7/2018 | Rickards | H04L 41/0893 |
| 2005/0262081 A1* | 11/2005 | Newman | G06F 17/30994 |
| 2007/0168347 A1 | 7/2007 | Childress et al. | |
| 2010/0299517 A1 | 11/2010 | Jukic et al. | |
| 2013/0223279 A1 | 8/2013 | Tinnakornsrisuphap et al. | |
| 2014/0280363 A1* | 9/2014 | Heng | G06F 16/21 707/802 |
| 2014/0366105 A1 | 12/2014 | Bradley et al. | |
| 2015/0193739 A1 | 7/2015 | Min et al. | |
| 2015/0294488 A1* | 10/2015 | Iwasaki | G06T 11/206 345/440 |
| 2016/0004759 A1* | 1/2016 | Ramakrishnan | G06F 3/048 715/753 |
| 2016/0103931 A1* | 4/2016 | Appavu | G06F 17/30436 707/760 |
| 2016/0110434 A1* | 4/2016 | Kakaraddi | G06F 17/30958 707/602 |
| 2016/0135241 A1 | 5/2016 | Gujral et al. | |
| 2016/0357524 A1 | 12/2016 | Maluf et al. | |
| 2017/0083386 A1 | 3/2017 | Wing et al. | |
| 2017/0168472 A1 | 6/2017 | Ando et al. | |
| 2017/0171313 A1 | 6/2017 | Britt et al. | |
| 2017/0247264 A1 | 8/2017 | Eddy | |
| 2018/0018402 A1* | 1/2018 | Vogler | G06F 17/30958 |
| 2018/0116004 A1 | 4/2018 | Britt et al. | |
| 2018/0208448 A1 | 7/2018 | Zimmerman et al. | |

OTHER PUBLICATIONS

"International Search Report and Written Opinion Issued in PCT Application No. PCT/US19/030798", dated Jul. 26, 2019, 12 Pages.

"International Search Report and Written Opinion Issued in PCT Application No. PCT/US19/030796", dated Jul. 26, 2019, 10 Pages.

"INT (x86 instruction)", https://en.wikipedia.org/w/index.php?title=INT_(x86_instruction)&oldid=809423342, Nov. 9, 2017, 2 Pages.

"International Search Report and Written Opinion Issued in PCT Patent Application No. PCT/US2019/030779", dated Jul. 10, 2019, 12 Pages.

"International Search Report & Written Opinion Issued in PCT Application No. PCT/US2019/030797", dated Jul. 8, 2019, 13 Pages.

* cited by examiner

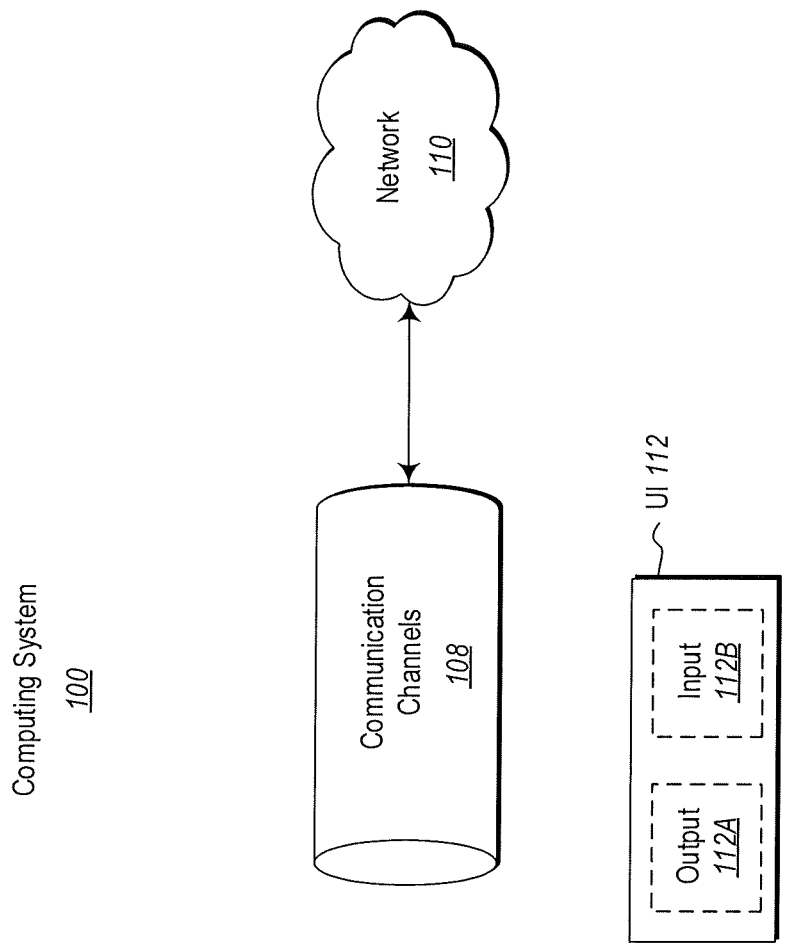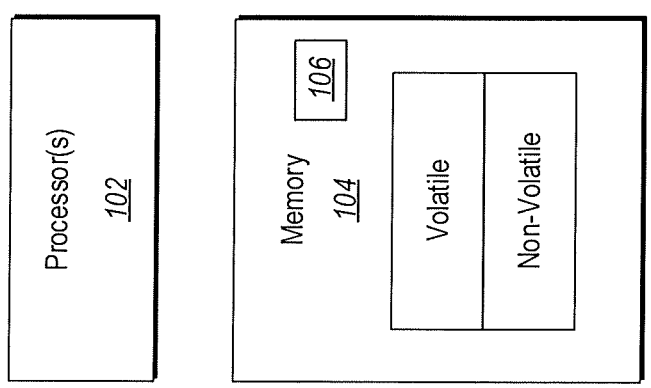
Fig. 1

METHODS AND SYSTEMS FOR GENERATING MAPS CORRESPONDING TO PHYSICAL SPACES, DEVICES, AND/OR USERS

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data.

As computing systems have become cheaper and smaller, they have begun to proliferate to almost all areas of life. For example, Internet of Things (IoT) devices are network-connected devices that are placed in many physical spaces to enable people to interact with and gather information about their environment. For example, offices or homes may include numerous IoT devices that can be used to control locks, to manage indoor climate and receive climate information, to manage lighting and receive lighting information, to open and close doors, to perform cleaning functions, to control audio and/or video equipment, to provide voice interaction, to provide security and monitoring capabilities, etc. As such, IoT devices can process and generate vast amounts of information. Notably, IoT devices are not limited to use in structures such as offices or homes. For example, IoT devices may be used to track any manner of physical items (including, for example, animals such as livestock or pets), to monitor health of people or animals, and so forth.

As IoT devices proliferate, it is becoming increasingly difficult to manage the devices and their users, and to process the data they generate. Notably, it may often be difficult to intuitively manage and group such devices (e.g., based on physical space or synergistic functionality), to efficiently control these devices (including controlling user access), to efficiently access data associated with these devices and/or to efficiently visualize live sensor data associated with these devices in relation to a physical space. For example, managing IoT devices could involve storing large amounts of data associated with the physical environment in which they exist (e.g., buildings with their floors, rooms, room types, objects the rooms, etc.). Similarly, large numbers of devices may also result in enormous amounts of generated data (e.g., sensor data) that may be difficult to manage and access, and to link to the physical environment.

BRIEF SUMMARY

At least some embodiments described herein relate to methods, systems, and computer program products for managing physical spaces, associated devices, and users, including providing access to sensor data from devices within a physical space. The embodiments are built on the observation by the inventors that IoT-related data generally includes first data that is relatively static (e.g., data relating to the physical environment in which the IoT devices exist), and data that is more dynamic (e.g., sensor data generated by the IoT devices, themselves).

In view of this recognition, the inventors have invented a multi-database environment for storing such data. In particular, the multi-database environment can include one or more first data structures (e.g., one or more graphs) that store relatively static information in the form of a topology of the physical environment in which the IoT devices exist, including storing references to the devices themselves and users associated with spaces in the physical environment and/or with devices. The first data structure(s) are configured to facilitate queries that can quickly identify physical spaces, users, and/or IoT device(s) within physical spaces—regardless of the size of the topology; quick queries could mean a tradeoff that operations updating the first data structure(s) is comparatively expensive.

The first data structure may also include map data corresponding to a particular node of the first data structure, wherein the map data is associated with at least a portion of a map corresponding to the given node. As such, the map data may be used to generate the portion of the map corresponding to the given node. The multi-database environment can also include one or more second data structures that store relatively dynamic information, such as sensor data generated by the IoT devices. The second data structure(s) are configured to efficiently store constantly changing data, and to provide quick access to data generated by an IoT device once that device has been identified using the first data structure(s). This constantly changing data may also be provided to a map generation component, such that the constantly changing data can then be displayed at a generated map corresponding to the physical space associated with the first data structure.

For example, methods, systems, and computer program products may include embodiments that access a hierarchical graph defining a topology of a physical space and comprising a plurality of nodes. The plurality of nodes of the hierarchical graph may comprise a top node for the physical space and a plurality of other nodes coupled, through zero or more intermediate nodes, to the top node of the physical space. Additionally, one or more of the plurality of nodes may comprise an area node or a sub-area node that each represent an area or sub-area within the physical space. Furthermore, one or more of the plurality of nodes may also comprise a device node that each represent a device located within the physical space. Each device may be configured to provide data or receive control signals.

Embodiments may further include, for a particular node of the plurality of nodes, generating map data corresponding to the particular node. The generated map data may be associated with generating at least a portion of a map corresponding to the particular node. The generated map data corresponding to the particular node may be stored within the hierarchical graph.

Accordingly, hierarchical graphs corresponding to a physical space may be utilized to generate maps displaying live (i.e., real-time or very close to real-time) sensor data. In particular, map data (e.g., Binary Large Objects (BLOB's)) that includes data for rendering at least a portion of a map may be generated for each given area node, sub-area node, device node, and/or sensor node of a hierarchical graph corresponding to a physical space. The map data corresponding to each node may then be linked such that a positioning of each entity (i.e., area, sub-area, device, and/or sensor) in relation to each other within the map may be properly rendered. Live sensor data may then be provided for display at the map via the live sensor database (i.e., the data store 271).

Additionally, multiple map data types (e.g., BLOB types) that are each associated with a different type of map (e.g., wayfinding map, HVAC map, and so forth) may be generated for any given node, such that multiple types of maps associated with a given physical space may be generated from a hierarchical graph corresponding to the given physical space. In this way, various types of custom maps associated with a given space that are configured to illustrate live sensor data may be stored and generated.

Furthermore, already-created maps of various formats (e.g., GEOJSON, .DWG, and so forth) corresponding to a given physical space may also be linked to a hierarchical graph of nodes corresponding to the same given physical space. As further described herein, the hierarchical graph may also have access to a database of live sensor data, which may then allow for rendering such live sensor data at the already-created map.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example computer architecture that facilitates operation of the principles described herein.

DETAILED DESCRIPTION

Figure 2:
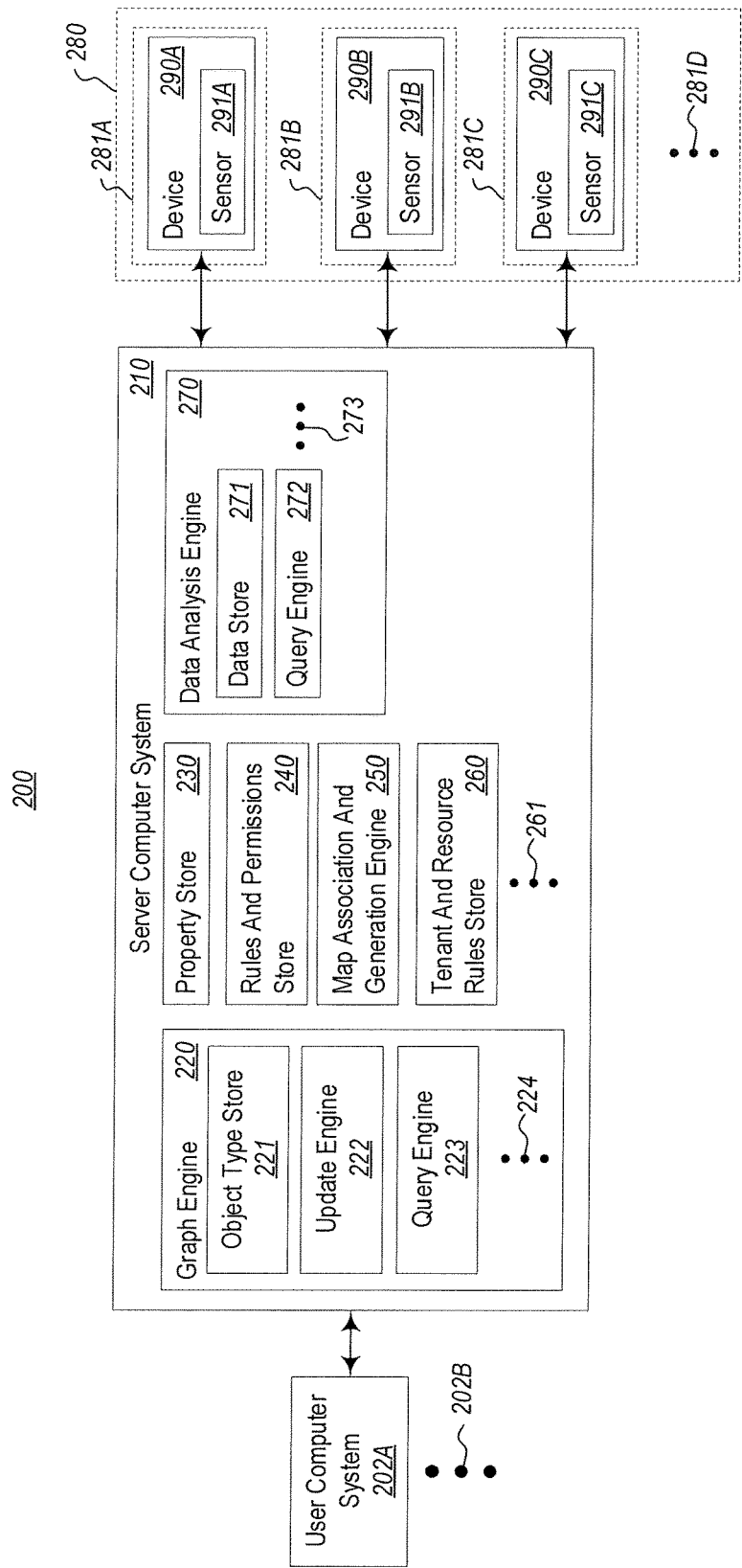
FIG. 2 illustrates an example environment for providing access to sensor data from devices within a physical space.

In the realm of Internet of Things (IoT) devices, there are unique challenges associated with managing the devices, including challenges in managing a representation of the devices as they relate to their physical environment, challenges with handling the vast amounts of data generated by the devices, and challenges with managing user access to the devices and user access rights for associating devices with spaces. For instance, a large organization may own several campuses in different geographical locations. Each of these campuses could be made of a large number of buildings, each of which could have many floors. Each of these floors, in turn could have a large number of physical spaces (e.g., conference rooms, offices, common areas, laboratories, etc.). Each of these physical spaces could include a number of objects, such as desks, chairs, lab equipment, etc. Each of these physical spaces and/or objects in the physical spaces could be associated with a number of IoT devices, each of which could include a number of sensors other data-generating hardware. Prior approaches have failed to efficiently represent these physical spaces and IoT devices, while providing efficient access to the data generated by the IoT devices. Additionally, prior approaches have failed to provide efficient mechanisms for managing user access as it relates to devices (e.g., user access rights for accessing sensor data and/or user access rights for managing the devices themselves), and/or for managing user access as it relates to physical spaces (e.g., for managing the layout of spaces including their sub-spaces, for managing adding/removing/managing devices in spaces, etc.). For instance, for a large organization, placing all of this data in a single hierarchical graph could result in a graph that is very large both in terms of depth and breadth—and which would require expensive graph traversal operations every time sensor data needs to be updated or accessed.

In view of this recognition, the inventors have invented a multi-database environment for storing such data. In particular, the multi-database environment can include one or more first data structures (e.g., one or more graphs) that store relatively static information in the form of a topology of the physical environment in which the IoT devices exist, including storing references to the devices themselves. The first data structure(s) are configured to facilitate queries that can quickly identify physical spaces, users, and/or IoT device(s) within physical spaces—regardless of the size of the topology; quick queries could mean a tradeoff that operations updating the first data structure(s) is comparatively expensive. The multi-database environment can also include one or more second data structures that store relatively dynamic information, such as sensor data generated by the IoT devices. The second data structure(s) are configured to efficiently store constantly changing data, and to provide quick access to data generated by an IoT device once that device has been identified using the first data structure(s). Users may be managed within the first data structure(s) (e.g., as user nodes associated with device nodes and/or with nodes relating to physical spaces) and/or within the second data structure(s).

The first data structure may also include map data corresponding to a particular node of the first data structure, wherein the map data is associated with at least a portion of a map corresponding to the given node. As such, the map data may be used to generate the portion of the map corresponding to the given node. The multi-database environment can also include one or more second data structures that store relatively dynamic information, such as sensor data generated by the IoT devices. The second data structure(s) are configured to efficiently store constantly changing data, and to provide quick access to data generated by an IoT device once that device has been identified using the first data structure(s). This constantly changing data may also be provided to a map generation component, such that the constantly changing data can then be displayed at a generated map corresponding to the physical space associated with the first data structure.

Some introductory discussion of a computing system will be described with respect to FIG. 1. Then, providing access to sensor data from devices within a physical space and generating maps corresponding to the physical space, consistent with the multi-database environment introduced above, will be described with respect to FIGS. 2 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes NAND flash memory or other flash memory, RAM, DRAM, SRAM, ROM, EEPROM, CD-ROM or other optical disk storage, solid-state disk storage, magnetic disk storage or other storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, traditional computing systems such as smartphones, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, etc.) and the like. In modern computing systems, in the age of Internet of Things (IoT), computing system configurations may be virtually any type of device including (but most certainly not limited to) smart luggage, smart clothing, smart jewelry, smart drinking bottles, smart skate boards, smart golf clubs, smart toys, smart brewing machines, smart wallets, smart home and business automation gear, smart appliances, smart furniture, etc. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Reference is made frequently herein to IoT devices. As used herein, an IoT device can include any device that is connected to a network (whether that be a personal area network, local area network, wide area network, and/or the Internet) and that interacts with a physical environment (whether that be to control or influence some aspect of a physical environment, and/or to receive sensor data from a physical environment). As such, references to IoT devices herein should be interpreted broadly to include vast categories of devices, regardless of how those devices may be named or marketed. From a computing perspective, IoT devices may range from fairly complex (e.g., such as being embodied on a general-purpose computer system), to fairly simple (e.g., such as being embodied within a special-purpose microcontroller environment).

FIG. 2 illustrates an example environment 200 for providing access to sensor data from devices within a physical space. As illustrated, the environment 200 includes a user computer system 202A. The user computer system 202A may be embodied, for example, by computer system 100, as described with respect to FIG. 1. The user computer system 202A may comprise any type of computer system that is configured to communicate with, and utilize the functionality of, a server computer system 210, which is described later. In an example, the user computer system 202A may comprise a desktop computer, a laptop computer, a tablet, a smartphone, and so forth. Notably, while the environment 200 includes a single user computer system 202A, the ellipses 202B represents that any number of user computer systems may communicate with, and utilize the functionality of, the server computer system 210.

The server computer system 210 is configured to receive, store, and provide access to sensor data from devices (such as IoT devices) located within physical spaces (e.g., a room within a building), as further described herein. Again, the server computer system 210 may be embodied, for example, by computer system 100, as described with respect to FIG. 1. The server computer system 210 may comprise any type of computer system, including any combination of hardware and/or software that is configured to provide access to sensor data from devices located within particular physical spaces.

As shown, the server computer system 210 may include various engines, functional blocks, and components, including (as examples) a graph engine 220, a property store 230, a rules and permissions store 240, a map association and generation engine 250, a tenant and resource rules store 260, and a data analysis engine 270, each of which may also include additional engines, functional blocks, and components (e.g., an object type store 221 within the graph engine 220). The various engines, components, and/or functional blocks of the server computer system 210 may be implemented on a single computer system, or may be implemented as a distributed computer system that includes elements resident in a cloud environment, and/or that implement aspects of cloud computing (i.e., at least one of the various illustrated engines may be implemented locally, while at least one other engine may be implemented remotely). In addition, the various engines, functional blocks, and/or components of the server computer system 210 may be implemented as software, hardware, or a combination of software and hardware.

Notably, the configuration of the server computer system 210 illustrated in FIG. 2 is shown only for exemplary purposes. As such, the server computer system 210 may include more or less than the engines, functional blocks, and/or components illustrated in FIG. 2. In particular, the ellipses 261 represent that any number of engines, functional blocks, and/or components may be utilized within the server computer system. Although not illustrated, the various engines of the server computer system 210 may access and/or utilize a processor and memory, such as the processor 102 and the memory 104 of FIG. 1, as needed, to perform their various functions.

Figure 3:
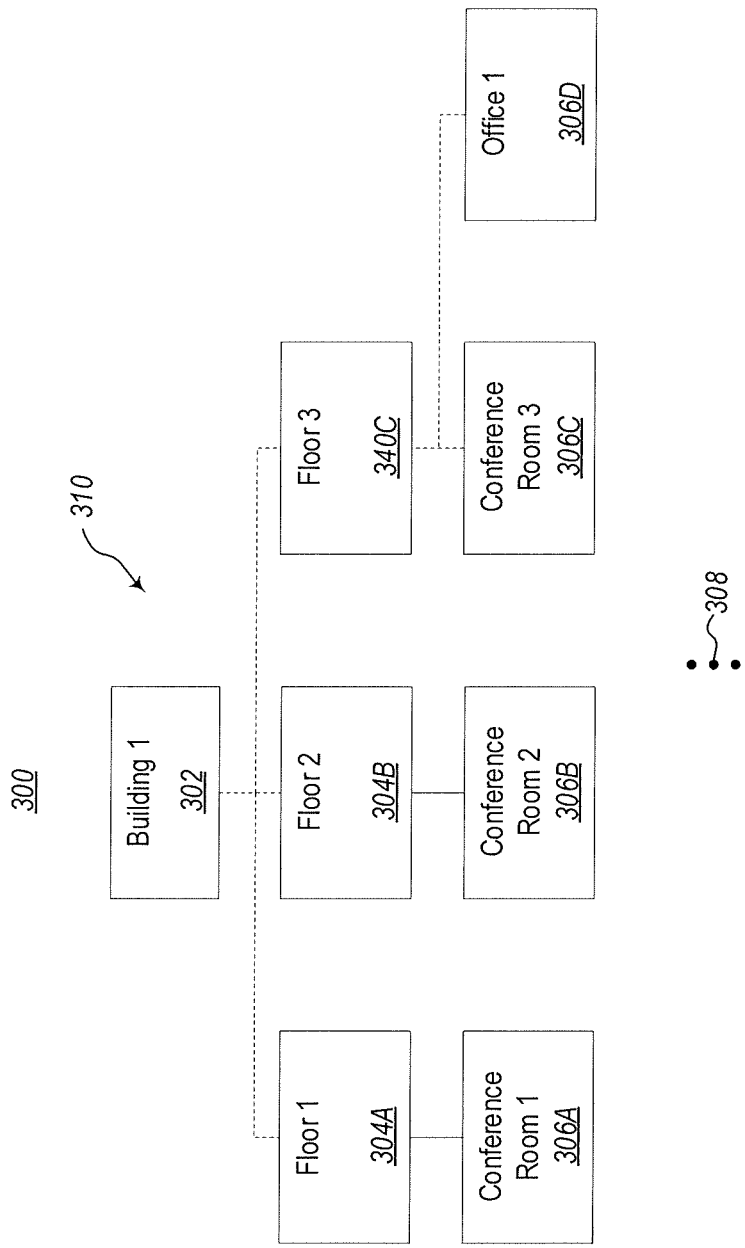
FIG. 3 illustrates an example hierarchical graph associated with a physical space.

As briefly introduced, the server computer system 210 includes the graph engine 220, the property store 230, the rules and permissions store 240, the map association and generation engine 250, the tenant and resource rules store 260, and the data analysis engine 270. The graph engine 220 may be configured to generate, store, and/or manage one or more hierarchical graphs (e.g., hierarchical graph 310 of FIG. 3) that defines a topology of areas and sub-areas of a physical space. For instance, FIG. 3 illustrates a hierarchical graph 310 that includes a topology of nodes associated with a physical space comprising "building 1" (e.g., building node 302). The hierarchical graph 310 also represents areas and sub-areas of "building 1," such as different floors (i.e., floor node 304A, floor node 304B, and floor node 304C, all of which are sub-nodes of building node 302), as well as different rooms (i.e., conference room node 306A, conference room node 306B, conference room node 306C, and office node 306D) associated with each floor. Although not shown, each of the room nodes 306A-306A could be associated with additional sub-nodes representing physical objects in the rooms, such as desks, chairs, tales, computer, lab equipment, etc.

Figure 4:
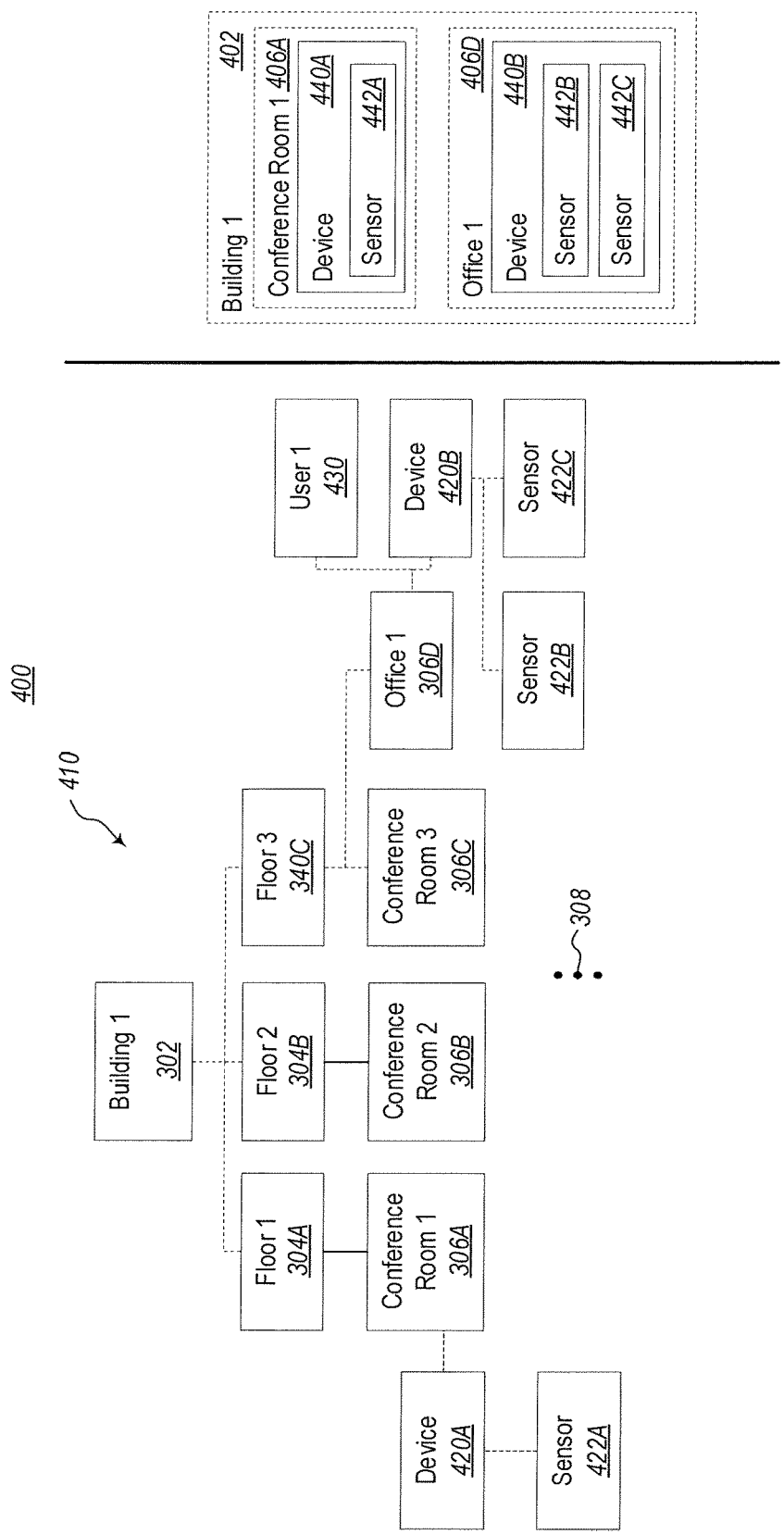
FIG. 4 illustrates an example hierarchical graph associated with a physical space and devices associated with areas or sub-areas of the physical space.

Any node in the hierarchical graph 310 could be associated with devices/sensors and/or users. For example, the various room nodes (i.e., the conference room node 306A and the office node 306D) may also be associated with devices and sensors, and the room nodes and/or the device/sensor nodes may be associated with user nodes. Similarly, FIG. 4 shows a related graph 410, that includes device nodes 420A and 420B and sensor nodes 422A-422C. While only seven nodes associated with areas/sub-areas are illustrated in FIG. 3, the ellipses 308 represents that any number of nodes that are associated with areas/sub-areas and devices/sensors may be utilized when practicing the principles described herein (whether those nodes be added or deleted in a horizontal direction (breadth) or a vertical direction (depth)). Furthermore, the topology of the graph may be continuously modified via adding or deleting nodes of the graph (in a horizontal direction or vertical direction). For instance, using the example of FIG. 3, a number of additional building nodes associated with different buildings than building 1 (corresponding to building node 302), each of which additional buildings may include additional nodes corresponding to floors, rooms, and so forth, may also be included within the graph 310.

In some embodiments, the hierarchical graph 310 may be stored within a relational database, though any type of database could be used. Additionally, regardless of the type of graph used, the full paths in the graph for each given node may be stored as metadata in the node to increase the performance and efficiency of querying the hierarchical graph 310. In this way, identification (e.g., via a query) of any ancestral node or child node (i.e., children nodes, grandchildren nodes, great-grandchildren nodes, and so on) of a given node may be performed in an order of one operation (i.e., an O(1) operation). For instance, a query that requests each node having a path that starts with "building1/floor3" (i.e., corresponding to the floor node 304C) may identify conference room 3 and office 1 (i.e., corresponding to conference room node 306C and office node 306D, respectively) as being children of the floor node 304C in an O(1) operation.

Notably, even if the conference room node 306C and the office node 306D were grandchildren, great-grandchildren, and so on, of the floor node 304C, a request for identification of each node having a path that starts with "building1/floor3" could result in identification of the conference room node 306C and the office node 306D (as well as any nodes between the floor node 304C and the conference room node 306C/the office node 306D) in an O(1) operation. Accordingly, paths associated with each node may be automatically computed and saved, which effectively tracks a primary identification for each node of the graph. While a cost is incurred upfront to generate and store each path (e.g., in connection with the addition and/or removal of one or more nodes to within the graph), the graph may be quickly and efficiently traversed to identify nodes and relationships between nodes within the graph than traditional traversing of graphs. By storing primarily static information in the graph, however, the need to generate/store these paths can be relatively infrequent.

Returning to FIG. 2, as illustrated, the graph engine 220 includes various components that may comprise any combination of appropriate hardware and/or software, including an object type store 221, an update engine 222, and a query engine 223. Notably, the ellipses 224 represents that any number of components may be included with the graph engine 220 (i.e., more or less than the components illustrated within the graph engine 220).

The object type store 221 comprises a data store of node object types that can be selected to create additional nodes within the graph 310. For instance, in addition to the node object types of buildings, floors, and rooms that are explicitly shown in FIG. 3, any number of object types associated with areas/sub-areas of physical spaces (as well as devices/sensors and users/individuals, as further described herein) may be used within the graph 310, including but not limited to organizations (e.g., businesses), geographic regions (e.g., continents, countries, states, cities, counties, and so forth), types of areas (e.g., buildings, farms, houses, apartments, conference rooms, offices, bathrooms, breakrooms, study areas, desks, chairs, and so forth), types of devices (e.g., thermostat, projector, paper towel dispenser, television, computer, and so forth), types of sensors (e.g., thermocouple, thermistor, humidity sensor, $CO_2$ sensor, Geiger counter), and so forth. Additionally, the object type store 221 may be extensible, such that additional object types may be created on demand.

The update engine 222 may be configured to update the hierarchical graph 310 with any changes made to the graph. For instance, the update engine 222 may update the graph with additional nodes, update the graph with less nodes (e.g., deleted nodes), update nodes with new or modified properties, update nodes with new or modified paths, and perform any other operations associated with modifying or updating the graph.

The query engine 223 may be configured to allow for performing queries to the hierarchical graph 310. In particular, the query engine 223 may be configured to receive queries, generate query plans, build responses to queries, and/or perform any other operations associated with receiving and responding to queries of the hierarchical graph 310.

As briefly introduced, the server computer system 210 further includes data analysis engine 270. The data analysis engine 270 may be configured to receive, gather, manage, and process data received from devices/sensors located within a physical space (associated with the hierarchical graph that defines the topology of the physical space). For instance, FIG. 2 illustrates various devices and sensors located within a physical space 280. In particular, the physical space 280 comprises various areas and sub-areas, including area/sub-area 281A, area/sub-area 281B, and area/sub-area 281C. Each of the sub-areas includes a single device having a single sensor (i.e., area/sub-area 281A includes device 290A having sensor 291A, area/sub-area 281B includes device 290B having sensor 291B, and area/sub-area 281C includes device 290C having sensor 291C). Notably, while each of the areas/sub-areas within the physical space 280 includes a single device having a single sensor, the ellipses 290 represents that there may be any number of areas/sub-areas within the physical space 280, each of the areas/sub-areas including any number of devices having any number of sensors (including zero devices/sensors).

Notably, the devices and sensors may include any type of devices/sensors, including but not limited to devices/sensors associated with detecting temperature, $CO_2$, light, pressure, toxic chemicals, humidity, and so forth. As such, the combination of the devices 290 (i.e., the device 290A through the device 290C) and the sensors 291 (i.e., the sensor 291A through the sensor 291C) may be configured to capture sensor data (e.g., changes in temperature) and send the captured data to the data analysis engine 270. The sensors may provide data to the data analysis engine 270 periodically and/or continuously. Thus, in some implementations, the data analysis engine 270 may receive, gather, manage, and process real-time or near real-time data received from the sensors. The sensors may actively push data to the data analysis engine 270, or may only provide it upon request.

The data analysis engine 270 may then be configured to receive, gather, manage, and process data received from such devices/sensors. In particular, as illustrated, the data analysis engine 270 may include a data store 271 that is configured to organize, store, and allow access to received sensor data. The data store 271 may comprise any type of data store that is configured to manage dynamic, frequently changing data such as sensor data, and that provides quick and efficient performance. In an example, the data store 271 may comprise a key-value database. For instance, the data store 271 may comprise a REDIS™ CACHE. While the data store 271 may store some data permanently, the data store 271 only store some data temporarily. For example, when receiving real-time or near real-time data, the data analysis engine 270 may processes large quantities of data, making it infeasible and/or undesirable to store it permanently. Data associated with a particular device (e.g., sensor data) may also be linked with device nodes of the hierarchical graph (e.g., the hierarchical graph 410), such that upon identification of a device node within the hierarchical graph, sensor data associated with the device corresponding to the device node may also be accessed, as further described herein.

As shown, the data analysis engine 270 further includes a query engine 272. The query engine 272 may be configured to allow for performing queries to the data store 271. In particular, the query engine 272 may be configured to receive queries, generate query plans, build responses to queries, and/or perform any other operations associated with receiving and responding to queries of the data store 271.

FIG. 4 illustrates an environment 400 including hierarchical graph 410 comprising area/sub-area nodes, as well as device/sensor nodes that are each associated with one or more area/sub-area nodes. As shown, the conference room node 306A is associated with device node 420A (having a corresponding sensor node 422A) and the office node 306D is associated with the device node 420B (having two corresponding sensor nodes, the sensor node 422B and the sensor node 422C). Additionally, FIG. 4 includes a representation of an actual physical space 402 (associated with building 1) that corresponds to the building node 302.

As illustrated, the physical space 402 also comprises conference room 406A (associated with conference room 1 and corresponding to the conference room node 306A) that includes the actual physical device 440A having the sensor 442A, as well as office 406D (associated with office 1 and corresponding to the office node 306D) that includes the actual physical device 440B having both the sensor 442B and the sensor 442C. In a specific example, the device 440A may correspond to a thermostat that includes a thermocouple (i.e., the sensor 442A) for measuring temperature. Such temperature measurements may then be sent to the data analysis engine for managing, storing, and processing the received sensor data.

Additionally, as illustrated in FIG. 4, user nodes (e.g., user node 430) may be included within the hierarchical graph 410 as being associated with one or more area/sub-area nodes (though they could additionally, or alternatively, be associated with sensor/device nodes). In particular, FIG. 4 shows the user node 430 being associated with the office node 306D. In a specific example, the user 1 (i.e., corresponding to the user node 330) may comprise an individual that has been assigned to office 1 (i.e., corresponding to the office node 306D). In this example, user node 430 could be used to control a user's access to office node 306D, including, for example, the user's ability to modify office node 306D, to attached nodes to office node 306D, remove nodes from office node 306D, or modify nodes that are already attached to office node 306D, etc. In some embodiment, associating user node 430 with office node 306D applies the user node's permissions to all nodes hierarchically below office node 306D in hierarchical graph 410. Similar application of access rights could apply when associating a user node with a sensor/device node.

Notably, regardless of object/node type (e.g., area/sub-area nodes, device nodes, sensor nodes, user nodes), data and/or metadata associated with the node may be stored in the hierarchical graph (e.g., the hierarchical graph 310 or the hierarchical graph 410), the data store 271 of the data analysis engine 270, or any other appropriate location associated with the server computer system 210.

As briefly introduced, the server computer system 210 further includes property store 230, rules and permissions store 240, map association and generation engine 250, and tenant and resource store 260. The property store 230 may comprise a data store that includes properties associated with nodes of the hierarchical graph 310. For instance, particular properties may automatically be associated with particular object types (i.e., node types), as well as children of such object types. In a more particular example, a property associated with occupancy of a chair within a room may propagate to the room itself (i.e., showing that the room is occupied). Furthermore, as discussed with respect to the object type store 231, the property store may also be extensible, such that properties may be created and associated with any given node, and potentially associated with ancestral or children nodes of the given node.

The rules and permissions store 240 may include various rules and permissions associated with particular roles assigned to users. For instance, based on a particular role (e.g., an administrator) assigned to a user, the user may have access to perform various operations, including adding/deleting nodes, modifying nodes, accessing/modifying functionality of various devices (e.g., locking doors), and so forth. The rules/permissions stored in the rules and permissions store 240 may be applied to various nodes in the hierarchical graph, whether those be area/sub-area nodes, sensor/device nodes, or user nodes. The rules/permissions stored in the rules and permissions store 240 may additionally, or alternatively, be applied data in the data store 271. In some embodiments, user nodes that are associated with nodes in the graph (e.g., areas or devices/sensors) grant corresponding users access to the associated node, and user rules/permissions associated with those user nodes are managed in the rules and permissions store 240.

The map association and generation engine 250 may be configured to perform numerous functions with respect to associating maps with the hierarchical graph (and devices providing data to the data store), and/or generating the hierarchical graph, itself. For instance, the map association and generation engine 250 may be able to generate the hierarchal graph 300 based on user input and/or based on a map. In another example, the map association and generation engine 250 may be able to link nodes of the hierarchical graph to locations or devices included within a map. In yet another example, the map association and generation engine 250 may further be able to generate a map based on information included within the hierarchical graph corresponding to nodes of the hierarchical graph.

The tenant and resource rules store 260 may include rules associated with how resources, permissions, properties, and so forth are to be handled for each given entity (e.g., tenant) that utilizes the hierarchical graph.

Notably, the ellipses 261 represent that the server computer system 210 may include any number of components (i.e., whether more or less) than the components illustrated within the server computer system in FIG. 2. For instance, while both the graph engine 220 and the data analysis engine 270 include corresponding query engines (i.e., the query engine 223 and the query engine 272, respectively), an overarching query engine may be included within the physical analytics computer system that allows for querying both the graph engine 220 and the data analysis engine 270. In this way, a user may be able to generate queries that can traverse the hierarchical graph (e.g., the hierarchical graph 410) to identify one or more devices associated with a particular area/sub-area of the hierarchical graph, as well as current (or previous) sensor data associated with the one or more devices via the data store 271 and the data analysis engine 270.

Figure 5:
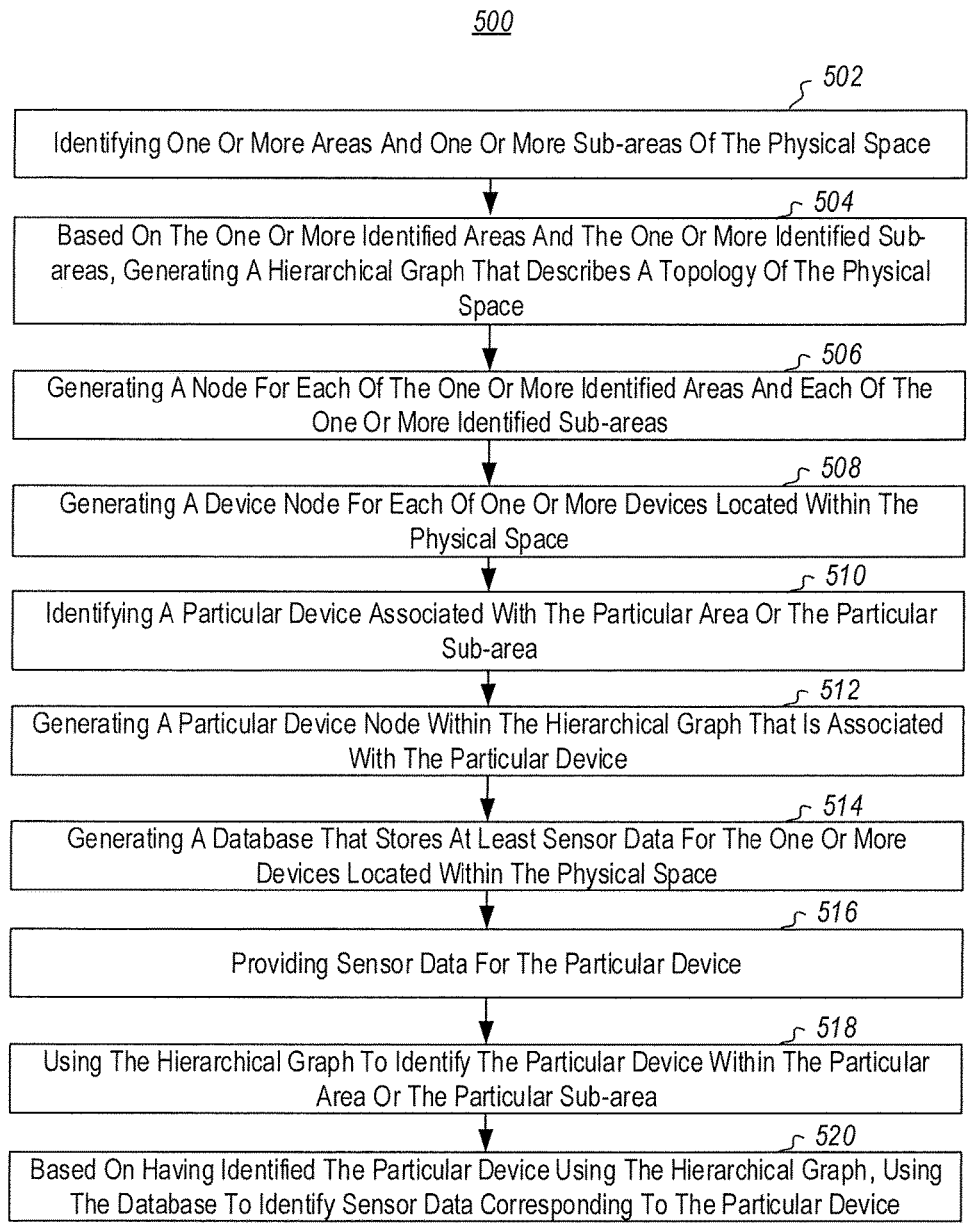
FIG. 5 illustrates a flowchart of a method for providing access to sensor data from devices within a physical space.

FIG. 5 illustrates a flowchart of a method 500 for providing access to sensor data from devices within a physical space. The method 500 is described with frequent reference to the environments of FIGS. 2-4. As shown, the method 500 includes identifying one or more areas and one or more sub-areas of the physical space (Act 502). For instance, the building 402, the conference room 406A, and/or the office 406D of FIG. 4 may be identified by the map association and generation engine 250. The method 500 further includes, based on the one or more identified areas and the one or more identified sub-areas, generating a hierarchical graph that describes a topology of the physical space (Act 504). For instance, based on the identification of the building 402 (and its corresponding areas/sub-areas), the hierarchical graph 410 may be generated by the map association and generation engine 250.

Generating the hierarchical graph further includes generating a node for each of the one or more identified areas and each of the one or more identified sub-areas (Act 506). For example, the hierarchical graph 410 includes various nodes based on an identification of areas/sub-areas associated with the building 402. Generating the hierarchical graph also includes generating a device node for each of one or more devices located within the physical space (Act 508). For instance, an identification of the device 440A and the device 440B may result in generating the device node 420A and the device node 420B, respectively.

Generating the device node for each of one or more devices located within the physical space further includes, for a particular one of the one or more areas or the one or more sub-areas, identifying a particular device associated with the particular area or the particular sub-area (Act 510). The particular device may include one or more sensors that generate data. For example, the device 440A may be identified, as well as the sensor 442A.

Generating the device node for each of one or more devices located within the physical space further includes, for a particular one of the one or more areas or the one or more sub-areas, generating a particular device node within the hierarchical graph that is associated with the particular device (Act 512). The particular device node may be a sub-node of a particular node that was generated for the particular area or the particular sub-area. For instance, the device node 420A may be generated in response to identifying the device 440A, and may further be associated with a particular area/sub-area node (i.e., the device node 420A being associated with the conference room node 306A). Additionally, any sensors associated with the device 440A may be identified, including the sensor 422A.

The method 500 further includes generating a database that stores at least sensor data for the one or more devices located within the physical space (Act 514). The database may be associated with, but separate from, the hierarchical graph. For example, the data store 271 may be generated for managing, storing, and accessing received sensor data. The method 500 may further include providing sensor data for the particular device (Act 516). For example, data from the sensor 442A of device 440A may be provided to the data store 271. In a more specific example, the sensor 442A may be configured to measure $CO_2$ levels, which measurements may be provided by the device 440A (or by another device capable of communicating with the device 440A) to the data store 271 (and ultimately, the data analysis engine 270).

Providing sensor data for the particular device may also include using the hierarchical graph to identify the particular device within the particular area or the particular sub-area (Act 518). For example, a query provided to the server computer system 210 (and perhaps directly to the graph engine 220) may request an identification of each device (and therefore each device node) associated with a particular area/sub-area (and therefore the particular area/sub-area node corresponding to the particular area/sub-area). Providing sensor data for the particular device may further include, based on having identified the particular device using the hierarchical graph, using the database to identify sensor data corresponding to the particular device (Act 520). For instance, upon identifying the device/device nodes (and the corresponding sensors/sensor nodes), sensor data associated with the devices/sensors may then be identified within the data store 271.

Accordingly, the principles described herein may allow for logically organizing devices (e.g., Internet of Things (IoT) devices) within physical spaces (or areas/sub-areas of physical spaces), and associating users with devices and/or spaces, thus allowing for intuitive organization and control of a plurality of devices, efficient use of such devices, and granular control of user access rights to devices and/or spaces. For instance, each device associated with a particular area/sub-area (e.g., on a particular floor of a building or a particular room) may be easily shut off or placed in a reduced power state, as location-based groupings of devices are automatically created. In particular, relatively static physical space data (e.g., data regarding floors and rooms of a building) and user access data may be placed in a reliable graph (e.g., a relational database), while more dynamic sensor data may be managed in a more dynamic database (e.g., a key-value database such as a REDIS CACHE).

The reliability of a hierarchical graph may be supplemented with quickness/efficiency by computing and storing paths associated with each node upfront when adding/removing/modifying nodes in the graph. Computing and storing the paths may then allow for performing queries with respect to ancestral nodes or child nodes of any given node in an O(1) operation. The hierarchical graph and the dynamic database may then be linked such that sensor data stored at the dynamic database may be quickly accessed when querying nodes associated with an area/sub-area within the hierarchical graph. Accordingly, storing the hierarchical graph and the dynamic database within an improved computer system (e.g., within memory and/or persistent storage) may improve the speed and efficiency of the computer system with respect to traversing the hierarchical graph in response to queries, building responses to queries (e.g., surfacing live sensor data associated with a particular area or sub-area of a physical space corresponding to the hierarchical graph), and so forth.

Figure 6:
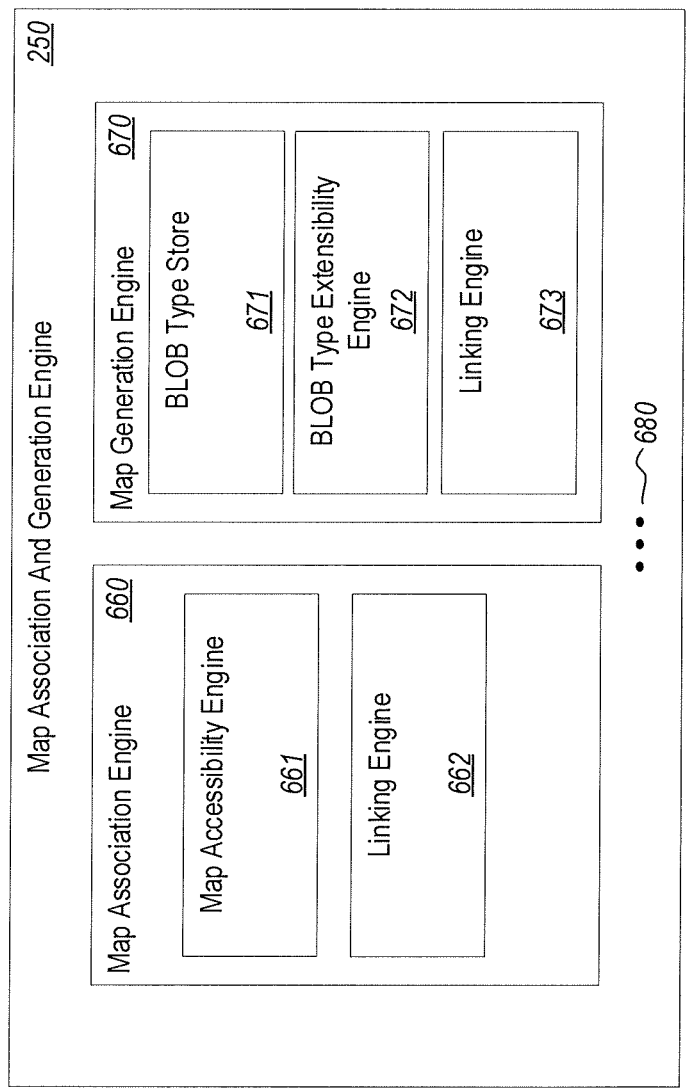
FIG. 6 illustrates a more specific embodiment of a map association and generation engine.

FIG. 6 illustrates a more detailed example of the map association and generation engine 250 of FIG. 2. As shown in FIG. 6, the map association and generation engine 250 includes both a map association engine 660 and a map generation engine 670. Additionally, ellipses 680 illustrates that the map association and generation engine 250 may include more or less than the components (e.g., the map association engine 660, the map accessibility engine 661, and so forth) shown in FIG. 6.

The map association engine 660 may be configured to link entities (e.g., areas, sub-areas, devices, sensors, and so forth) illustrated within a map of a physical space to nodes of a hierarchical graph that corresponds to the physical space. As illustrated, the map association engine 660 includes both a map accessibility engine 661 and a linking engine 662. The map association engine 660 may be capable of accessing a map associated with a physical space for which a hierarchical map has been created.

Figure 7:
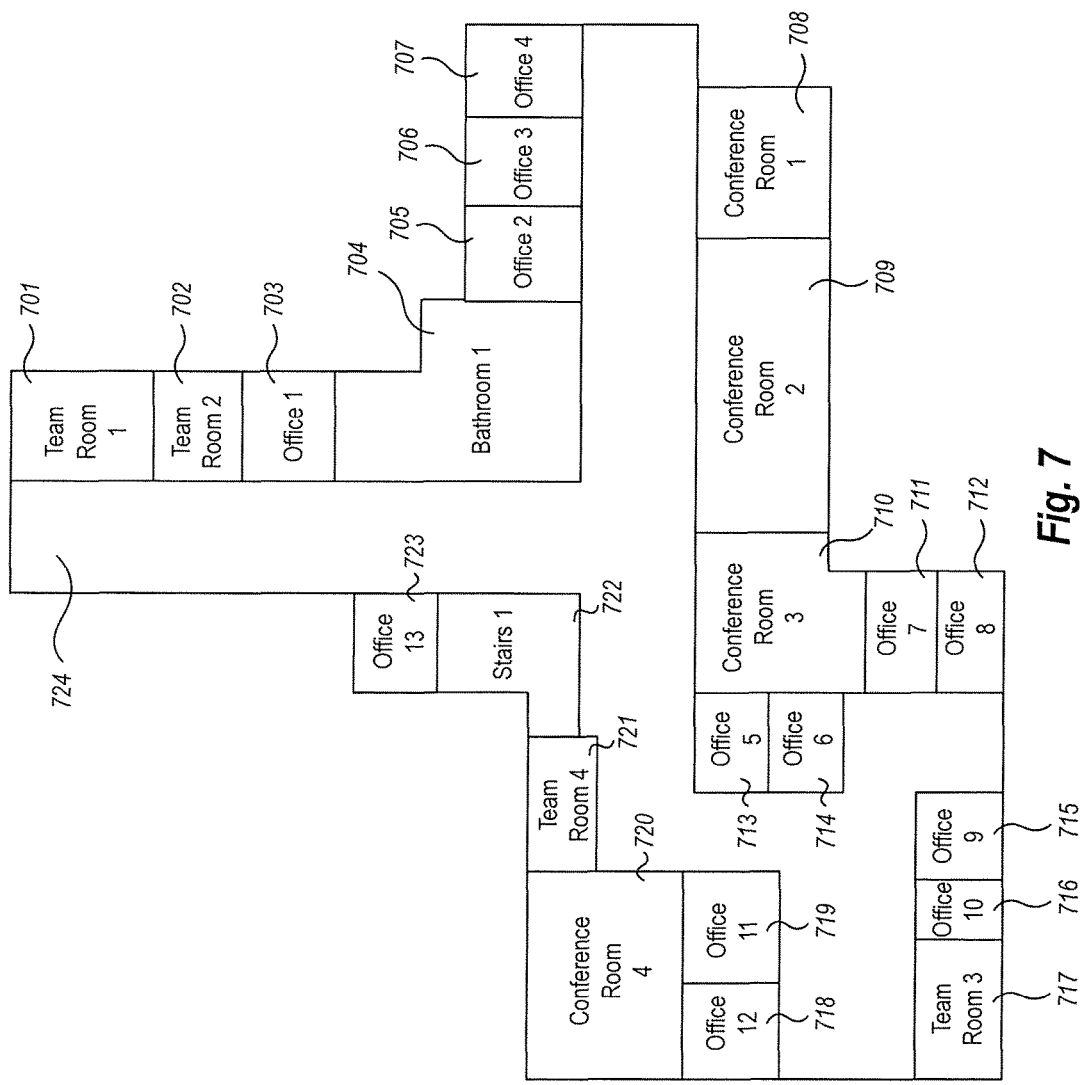
FIG. 7 illustrates an example of a map corresponding to a physical space.

For instance, FIG. 7 illustrates a map 700 that comprises various areas and sub-areas, including a team room 701, a team room 702, an office 703, a bathroom 704, an office 705, an office 706, an office 707, a conference room 708, a conference room 709, a conference room 710, an office 711, an office 712, an office 713, an office 714, an office 715, an office 716, a team room 717, an office 718, an office 719, a conference room 720, a team room 721, a set of stairs 722, an office 723, and a hallway 724. Additionally, while not shown, the map 700 may also include locations of devices and/or sensors within areas and sub-areas of the map.

Such a map may comprise any file or data format, including but not limited to GEOJSON, portable document format (PDF), DWG, scalable vector graphics (SVG), etc. In some embodiments, a file/data format includes structured data, which can be used by the map association engine 660 to create identifiers for any given entity (e.g., area, sub-area, device, sensor, and so forth) illustrated within the map. Such embodiments may also allow for adding metadata to entities in addition to these entity identifiers. For instance, the linking engine 662 may be configured to generate a tag for any given entity within a map (e.g., the team room 701) that defines a link between the entity and a corresponding node of a hierarchical graph that is associated with the same entity. In an example, assume that the office 703 of the map 700 in FIG. 7 corresponds to the office node 306D of the hierarchical graph 310 in FIG. 3. In such a case, an identifier associated with both the office 703 within the map 700 and the office node 306D may be the same. For instance, in the current example, such an identifier may be "Office 1," though it could be any form of identifier including, for example, a globally-unique identifier (GUID). In some embodiments, linking between a hierarchical graph and a map may be at least partially performed automatically using heuristics and/or machine learning. For instance, links may be automatically generated between a node of a hierarchical graph and an entity of a map when the node and the entity are determined to have the same, or a similar, identifier.

Notably, the linking engine 662 may also generate a tag for the corresponding node in the hierarchical graph that defines the link between the node and the corresponding entity of the map. As described more fully herein, each area node and sub-area node may also be linked to devices and/or sensors located within the corresponding area or sub-area (e.g., a room) of the physical space corresponding to the hierarchical graph of nodes. As part of such linking, the hierarchical graph of nodes may have access to, whether pulling sensor data or receiving sensor data from, the live sensor data being gathered in the data store 271. In this way, linking may then allow for providing live data to a rendered view of a map (e.g., the map 700). For instance, based on a motion detector sensing that an individual has entered a room of a physical space for which there is a hierarchical graph, a rendering of the room within a rendered map of the physical space may indicate that the room is occupied. For instance, within the rendered version of the map, a color of the room may change (e.g., from red to green), an occupied symbol may appear, text stating "Occupied" may be illustrated, and so forth.

As briefly described, the map association and generation engine also includes the map generation engine 670. As illustrated, the map generation engine 670 includes a Binary Large Object (BLOB) type store 671, a BLOB type extensibility engine 672, and a linking engine 673. The map generation engine 670 may be configured to generate a map based on data stored within a hierarchical graph that corresponds to a physical space. In some embodiments, each given node of such a hierarchical graph (e.g., the hierarchical graph 310) may include data associated with rendering a portion of a map that corresponds to the given node. For instance, an office node may include data associated with rendering the office corresponding to the node as part of a map. In an example, such data may comprise a Binary Large Object (BLOB), such as a corresponding portion of structured data (e.g., GEOJSON, PDF, DWG, SVG), etc.) usable to visually render a map. In such embodiments, each given node of a hierarchical graph may include a BLOB that comprises sufficient data for rendering at least a portion of a map associated with an entity (e.g., area, sub-area, device, sensor, and so forth) that corresponds to the given node.

As briefly described, the map generation engine 670 includes a BLOB type store 671. The BLOB type store 671 may include various types and subtypes of BLOB's, including area BLOB's, sub-area BLOB's, device BLOB's, and sensor BLOB's. Each of these BLOB types may include information related to a corresponding entity (e.g., area, device, sensor), including an identifier of the entity, properties associated with the entity, a location of the entity (e.g., Global Positioning System (GPS) coordinates), rules associated with the entity, and so forth.

In addition, the BLOB type store 671 may include BLOB types associated with generating at least a portion of a map associated with an area, sub-area, device, or sensor, as well as an associated subtype of BLOB that corresponds to a type of map to be generated. For instance, the BLOB type store may include BLOB types associated with generating a wayfinding map (e.g., a wayfinding floor map); an electrical grid map; a water and sewer map; a heating, ventilation, and air conditioning (HVAC) map; a satellite map; and so forth. Each type of BLOB may be formatted to generate at least a portion of a particular type of map corresponding to a particular area, sub-area, device, or sensor.

Accordingly, each given node of a hierarchical graph may include a BLOB that can be used to generate a portion of a map that corresponds to the area, sub-area, device, or sensor corresponding to the given node. In some embodiments, each node may include multiple different associated BLOB types. For instance, a given area node (e.g., an office node) may include a wayfinding map BLOB type associated with the given area, an HVAC map BLOB type associated with the given area, and a water and sewer map BLOB type associated with the given area. Based on each of these associated BLOB types, multiple different types of maps may be generated that each corresponding to a given area, sub-area, device, or sensor. Notably, each BLOB associated with a particular node may be stored, along with the node, in a corresponding hierarchical graph of the particular node As briefly described, the map generation engine 250 also includes the BLOB type extensibility engine 672. The BLOB type extensibility engine may allow for creating any type of BLOB. For instance, a user may desire to generate a hierarchical graph for a unique type of physical space, and thus create additional BLOB types corresponding to the unique physical space.

In addition, the map generation engine 250 includes a linking engine 673. The linking engine may be configured to link each area node, sub-area node, device node, device node, sensor node, and user node, such that a full map (e.g., the map 700) may be generated that includes the relative positioning of each area, sub-area, device, and sensor in relation to each other. In some embodiments, such linking may comprise including linking information within each BLOB associated with each node, such that relative positioning of each area, sub-area, device, and/or sensor may be determined in relation to each other.

Again, in this way, live sensor data may also be provided to a rendered version of the map (e.g., occupancy of a room based on generated sensor data within the room). In particular, as more fully described herein, the hierarchical graph may also have access to live sensor data stored at the data store 271. As such, queries may be continually or periodically performed to determine a current status of each device or sensor located within in any given area or sub-area. Then, based on a current status and any associated rules, sensor data may displayed at the rendered map and/or any corresponding changes to the map may be made. For instance, a rule may be created that includes changing an occupancy status of a room when motion is detected within a room (e.g., changing a color of the room within the map to demonstrate current occupancy). Notably, a rendering of the map may also display various levels of granularity based on a zoom level when viewing the rendered map. For instance, when zooming in, the map may show details such as temperature, users within a given area, and so forth, while when zooming out, the map may show less granular details such as simply whether or not a room is occupied.

Figure 8:
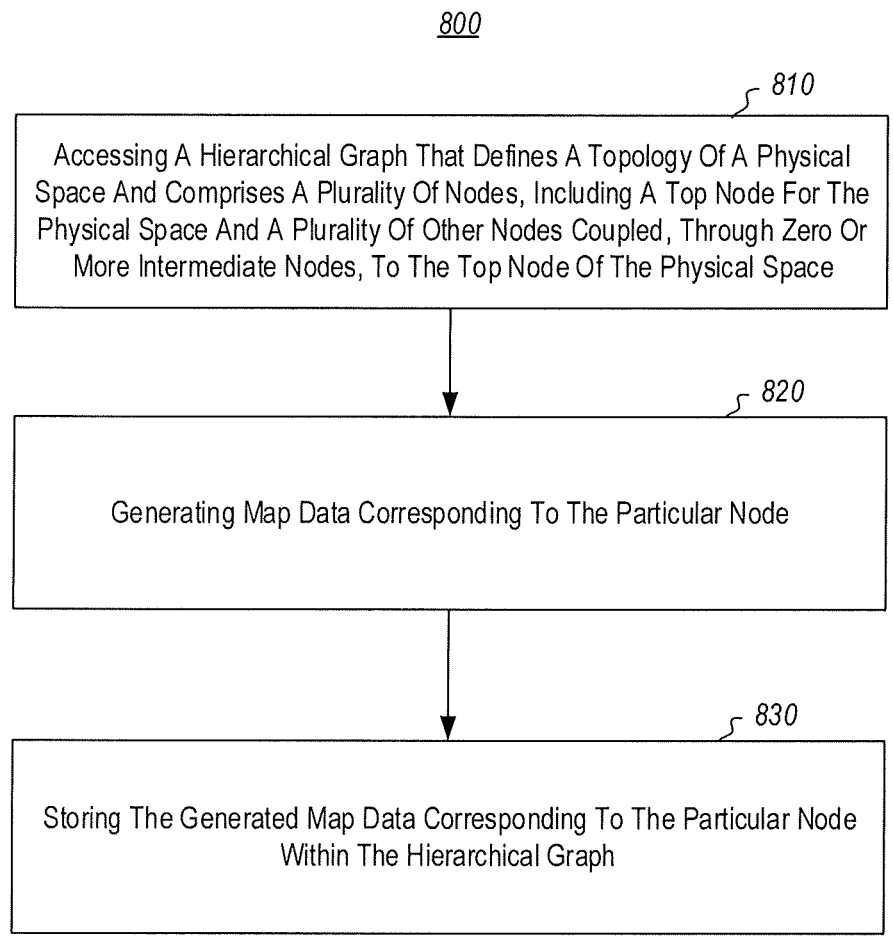
FIG. 8 illustrates a flowchart of a method for generating a map based on nodes of a hierarchical graph that is configured to provide access to sensor data from devices within a physical space

FIG. 8 illustrates a flowchart of a method 800 for generating a map based on nodes of a hierarchical graph that is configured to provide access to sensor data from devices within a physical space. The method 800 is described with frequent reference to the environments of FIGS. 2-7. As shown in FIG. 8, the method 800 includes accessing a hierarchical graph that defines a topology of a physical space and comprises a plurality of nodes (Act 810). The plurality of nodes of the hierarchical graph may comprise a top node for the physical space and a plurality of other nodes coupled, through zero or more intermediate nodes, to the top node of the physical space. One or more of the plurality of nodes may comprise an area node or a sub-area node, wherein each area node and sub-area node represents an area or sub-area within the physical space. One or more of the plurality of nodes also may comprise a device node, wherein each device node represents a device located within the physical space and is configured to provide data or receive control signals. For instance, the hierarchical graph 310 of FIG. 3 that defines a topology of a physical space and includes a plurality of nodes may be accessed by the map association and generation engine 250.

The method 800 further includes, for a particular node of the plurality of nodes, generating map data corresponding to the particular node (Act 820). The generated map data is associated with generating at least a portion of a map corresponding to the particular node. For instance, the map generation engine 670 may generate a BLOB associated with a particular node of the hierarchical graph 310 that is formatted for generating a portion of a map associated with an area, sub-area, device, and/or sensor corresponding to the particular node. The method 800 further includes, for a particular node of the plurality of nodes, storing the generated map data corresponding to the particular node within the hierarchical graph (Act 830). For example, the generated BLOB may be stored at the hierarchical graph 310. The stored BLOB associated with the particular node may then be used to generate the portion of the map corresponding to the particular node, as further described herein.

Accordingly, hierarchical graphs corresponding to a physical space may be utilized to generate maps displaying live (i.e., real-time or very close to real-time) sensor data. In particular, BLOB's that include data for rendering at least a portion of a map may be generated for each given area node, sub-area node, device node, and/or sensor node of a hierarchical graph corresponding to a physical space. The BLOB's corresponding to each node may then be linked such that a positioning of each entity (i.e., area, sub-area, device, and/or sensor) in relation to each other within the map may be properly rendered. Live sensor data may then be provided for display at the map via the live sensor database (i.e., the data store 271).

Additionally, multiple BLOB types that are each associated with a different type of map (e.g., wayfinding map, HVAC map, and so forth) may be generated for any given node, such that multiple types of maps associated with a given physical space may be generated from a hierarchical graph corresponding to the given physical space. In this way, various types of custom maps associated with a given space that are configured to illustrate live sensor data may be stored and generated.

Furthermore, already-created maps of various formats (e.g., GEOJSON, PDF, DWG, SVG, and so forth) corresponding to a given physical space may also be linked to a hierarchical graph of nodes corresponding to the same given physical space. As further described herein, the hierarchical graph may also have access to a database of live sensor data, which may then allow for rendering such live sensor data at the already-created map.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system configured to generate a map based on nodes of a hierarchical graph that stores and provides access to sensor data from devices within a physical space, the system comprising:
    one or more processors; and
    one or more computer-readable storage media having stored thereon computer-executable instructions that are executable by the one or more processors to cause the computer system to perform at least the following:
    access a hierarchical graph that defines a topology of a physical space and comprises a plurality of nodes, the plurality of nodes of the hierarchical graph comprising a top node for the physical space and a plurality of other nodes coupled, through zero or more intermediate nodes, to the top node of the physical space, one or more of the plurality of nodes comprising an area node or a sub-area node, each area node and sub-area node representing an area or sub-area within the physical space, one or more of the plurality of nodes also comprising a device node, each device node representing a device located within the physical space, each device being configured to provide data or receive control signals, one or more of the plurality of nodes also comprising a user node that represents a user associated with an area or a device within the physical space; and
    for a particular node of the plurality of nodes,
        generate map data corresponding to the particular node, the generated map data being associated with generating at least a portion of a map corresponding to the particular node; and
        store the generated map data corresponding to the particular node within the hierarchical graph such that the stored generated map data can be used to generate the portion of the map corresponding to the particular node.

2. The computer system of claim 1, wherein the computer-executable instructions further include instructions that are executable to cause the computer system to generate a portion of a map corresponding to the particular node based on the generated map data.

3. The computer system of claim 2, wherein the generated map data comprises Binary Large Object (BLOB) data associated with generating a portion of a map corresponding to the particular node.

4. The computer system of claim 2, wherein the computer-executable instructions further include instructions that are executable to cause the computer system to display live sensor data associated with one or more sensors located at an area of the physical space corresponding to the generated portion of the map.

5. The computer system of claim 2, wherein the computer-executable instructions further include instructions that are executable to cause the computer system to:
    spatially link one or more additional nodes to the particular node; and
    generate a map portion corresponding to each of the one or more additional nodes based at least partially on the spatial link, such that each map portion is rendered within the map in a proper location relative to each other map portion.

6. The computer system of claim 1, wherein the computer system includes a BLOB type store that includes a plurality of BLOB types, each different BLOB type being formatted for utilization in generating a different map type, wherein one or more of the BLOB types is formatted for generating at least one of a wayfinding map, an electrical grid map, a heating, ventilation, and air conditioning (HVAC) map, or a water and sewer map.

7. The computer system of claim 1, wherein the computer-executable instructions further include instructions that are executable to cause the computer system to store within each given node in the hierarchical graph, a full path of the given node within the hierarchical graph.

8. The computer system of claim 7, wherein the computer-executable instructions further include instructions that are executable to cause the computer system to use the stored full path within a given node to perform a query that identifies at least one of (i) one or more parent nodes associated with the given node, or (ii) one or more child nodes associated with the given node.

9. The computer system of claim 8, wherein the query comprises an O(1) operation.

10. A computer implemented method for generating a map based on nodes of a hierarchical graph that that stores and provides access to sensor data from devices within a physical space, the method implemented at a computer system that includes one or more processors, the method comprising:
    accessing a hierarchical graph that defines a topology of a physical space and comprises a plurality of nodes, the plurality of nodes of the hierarchical graph comprising a top node for the physical space and a plurality of other nodes coupled, through zero or more intermediate nodes, to the top node of the physical space, one or more of the plurality of nodes comprising an area node or a sub-area node, each area node and sub-area node representing an area or sub-area within the physical space, one or more of the plurality of nodes also comprising a device node, each device node representing a device located within the physical space, each device being configured to provide data or receive control signals; and
    for a particular node of the plurality of nodes,
        generating map data corresponding to the particular node, the generated map data being associated with generating at least a portion of a map corresponding to the particular node; and storing the generated map data corresponding to the particular node within the hierarchical graph such that the stored generated map data can be used to generate the portion of the map corresponding to the particular node.

11. The method of claim 10, further comprising:
generating a portion of a map corresponding to the particular node based on the generated map data.

12. The method of claim 11, wherein the generated map data comprises Binary Large Object (BLOB) data associated with generating a portion of a map corresponding to the particular node.

13. The method of claim 11, further comprising:
displaying live sensor data associated with one or more sensors located at an area of the physical space corresponding to the generated portion of the map.

14. The method of claim 11, further comprising:
spatially linking one or more additional nodes to the particular node; and
generating a map portion corresponding to each of the one or more additional nodes based at least partially on the spatial link, such that each map portion is rendered within the map in a proper location relative to each other map portion.

15. The method of claim 10, wherein the computer system includes a BLOB type store that includes a plurality of BLOB types, each different BLOB type being formatted for utilization in generating a different map type, wherein one or more of the BLOB types is formatted for generating at least one of a wayfinding map, an electrical grid map, a heating, ventilation, and air conditioning (HVAC) map, or a water and sewer map.

16. The method of claim 10, further comprising:
storing within each given node in the hierarchical graph, a full path of the given node within the hierarchical graph.

17. The method of claim 16, further comprising:
using the stored full path within a given node to perform a query that identifies at least one of (i) one or more parent nodes associated with the given node, or (ii) one or more child nodes associated with the given node.

18. The method of claim 17, wherein one or more of the plurality of nodes also comprises a user node that represents a user associated with an area or a device within a physical space.

19. A computer program product for generating a map based on nodes of a hierarchical graph that stores and provides access to sensor data from devices within a physical space, the computer program product comprising one or more computer readable storage devices having stored thereon computer-executable instructions that are executable by one or more processors of a computer system to cause the computer system to perform at least the following:
access a hierarchical graph that defines a topology of a physical space and comprises a plurality of nodes, the plurality of nodes of the hierarchical graph comprising a top node for the physical space and a plurality of other nodes coupled, through zero or more intermediate nodes, to the top node of the physical space, one or more of the plurality of nodes comprising an area node or a sub-area node, each area node and sub-area node representing an area or sub-area within the physical space, one or more of the plurality of nodes also comprising a device node, each device node representing a device located within the physical space, each device being configured to provide data or receive control signals; and
for a particular node of the plurality of nodes,
generate map data corresponding to the particular node, the generated map data being associated with generating at least a portion of a map corresponding to the particular node; and
store the generated map data corresponding to the particular node within the hierarchical graph such that the stored generated map data can be used to generate the portion of the map corresponding to the particular node.

20. The computer program product in accordance with claim 19, wherein the computer-executable instructions further include instructions that are executable to cause the computer system to generate a portion of a map corresponding to the particular node based on the generated map data.

* * * * *